(12) United States Patent
Gross et al.

(10) Patent No.: US 7,702,485 B2
(45) Date of Patent: Apr. 20, 2010

(54) METHOD AND APPARATUS FOR PREDICTING REMAINING USEFUL LIFE FOR A COMPUTER SYSTEM

(75) Inventors: Kenny C. Gross, San Diego, CA (US); Keith A. Whisnant, San Diego, CA (US); Aleksey M. Urmanov, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 602 days.

(21) Appl. No.: 11/635,450

(22) Filed: Dec. 6, 2006

(65) Prior Publication Data

US 2008/0140362 A1   Jun. 12, 2008

(51) Int. Cl.
*G06F 11/30* (2006.01)
(52) U.S. Cl. .................................................. 702/183
(58) Field of Classification Search ................ 709/223; 714/100, 699; 702/183
See application file for complete search history.

(56) References Cited

U.S. PATENT DOCUMENTS

| | | | | |
|---|---|---|---|---|
| 5,680,541 A | * | 10/1997 | Kurosu et al. | 714/26 |
| 5,822,218 A | * | 10/1998 | Moosa et al. | 716/4 |
| 6,243,628 B1 | * | 6/2001 | Bliley et al. | 701/29 |
| 6,609,212 B1 | * | 8/2003 | Smith | 714/4 |
| 6,714,893 B2 | * | 3/2004 | Busche et al. | 702/181 |
| 6,747,824 B1 | * | 6/2004 | Smith | 360/31 |
| 6,802,020 B1 | * | 10/2004 | Smith | 714/4 |
| 6,896,179 B2 | * | 5/2005 | Satoh et al. | 235/379 |
| 7,003,409 B2 | * | 2/2006 | Hepner et al. | 702/60 |
| 7,006,947 B2 | * | 2/2006 | Tryon et al. | 702/183 |
| 7,016,825 B1 | * | 3/2006 | Tryon, III | 703/6 |
| 7,230,527 B2 | * | 6/2007 | Basu et al. | 340/506 |
| 7,272,755 B2 | * | 9/2007 | Smith | 714/47 |
| 7,292,659 B1 | * | 11/2007 | Gross et al. | 375/343 |
| 7,328,367 B2 | * | 2/2008 | Ukai et al. | 714/7 |
| 7,397,385 B1 | * | 7/2008 | Bajpay et al. | 340/652 |
| 7,480,601 B2 | * | 1/2009 | Tryon, III | 703/7 |

\* cited by examiner

*Primary Examiner*—David Y Eng
(74) *Attorney, Agent, or Firm*—Park, Vaughan & Fleming LLP; Anthony P. Jones (57) ABSTRACT

One embodiment of the present invention provides a system for predicting a remaining useful life (RUL) for a computer system. The system starts by collecting values for at least one telemetry metric from the computer system while the computer system is operating. The system then uses the collected values to generate a RUL prediction for the computer system or a component within the computer system.

12 Claims, 6 Drawing Sheets

Value of the prognostic parameters $x_1$ and $x_2$

METHOD AND APPARATUS FOR PREDICTING REMAINING USEFUL LIFE FOR A COMPUTER SYSTEM

BACKGROUND

1. Field of the Invention

The present invention relates to techniques for detecting impending problems in computer systems. More specifically, the present invention relates to a method and apparatus for predicting the remaining useful life of a computer system.

2. Related Art

For many safety-critical applications of computers, it is not sufficient to know whether a computer is healthy or at risk; the user also needs to know the "remaining useful life" (RUL) for the computer with a high confidence factor. In fact, the United States Department of Defense has recently issued a requirement that all future mission-critical and safety-critical computers have RUL capability. An example where RUL estimation capability is important is for scenarios such as the following. Suppose one is planning a mission-critical operation (for example a battle situation) that may last 72 hours. Before committing an asset plus one or more human lives to the operation, one needs to know if the RUL of all computers aboard the asset is longer than 72 hrs, and it is useful to know this with a quantitative confidence factor.

In additional being crucial for life-critical applications, RUL estimation is also beneficial for many eCommerce applications for enterprise servers. For example, consider a scenario where a server at a customer datacenter starts issuing warning flags in the middle of a busy work day. In this situation, the account team would likely want to know if the problematic field replaceable unit (FRU) needs to be swapped as soon as possible; or if the server can continue operating until a scheduled shutdown on Saturday night. RUL estimation capability could add significant return on investment in such situations.

At present, the most commonly used technique for assessing the reliability of a computer system is to estimate a mean-time-between-failure (MTBF) for the computer system. However, a MTBF estimation is a fairly crude measure that provides little insight into how a long a computer system is likely to continue operating based on the current operational state of the computer system.

Hence what is needed is a system which provides users with an accurate estimation of remaining useful life for a computer system.

SUMMARY

One embodiment of the present invention provides a system for predicting a remaining useful life (RUL) for a computer system. The system starts by collecting values for at least one telemetry metric from the computer system while the computer system is operating. The system then uses the collected values to generate a RUL prediction for the computer system or a component within the computer system.

In a variation of this embodiment, collecting the values of the telemetry metric involves repeatedly measuring at least one computer system parameter at a predetermined time interval, wherein the computer system parameter includes at least one of: a usage rating, an idle time measure, a throughput, a latency within the computer system, a load in the computer system, a result returned from a software-based monitor, or another software parameter that indicates a current operating state of the computer system.

In a variation of this embodiment, collecting the values of the telemetry metric involves repeatedly measuring a computer system parameter at a predetermined time interval, wherein the computer system parameter includes at least one of: a temperature, a voltage, a current, or another physical parameter that indicates a current operating state of the computer system.

In a variation of this embodiment, when generating the RUL prediction from the collected values, the system uses a non-linear, non-parametric regression model to predict a value for a current value of a telemetry metric. The system then calculates a residual value that is the difference between the current value and the predicted value for the telemetry metric. Next, the system checks the residual value using a sequential probability ratio test (SPRT), wherein the SPRT generates an alarm based upon the residual value and a prior sequence of residual values. The system then determines a rate at which the SPRT is generating alarms.

In a variation of this embodiment, calculating the non-linear, non-parametric regression involves using a multivariate state estimation technique (MSET).

In a variation of this embodiment, when generating the RUL prediction, the system inputs the rate at which the SPRT is generating alarms into a mathematical model for generating a RUL, wherein the mathematical model is created from prior failure data. The system then returns a RUL estimate calculated using the mathematical model.

In a variation of this embodiment, the mathematical model is a linear logistic regression model.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Real-Time Telemetry System

Figure 1:
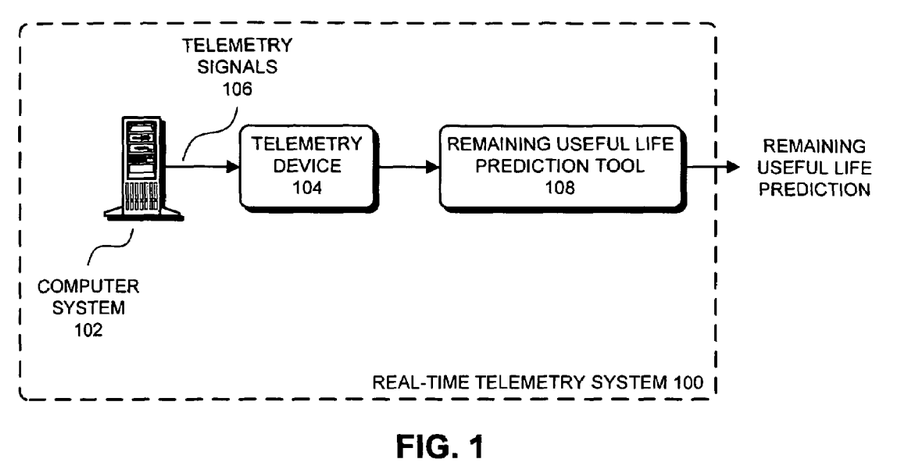
FIG. 1 illustrates a real-time telemetry system in accordance with an embodiment of the present invention.

FIG. 1 illustrates real-time telemetry system 100 in accordance with an embodiment of the present invention. Real-time telemetry system 100 contains computer system 102. Computer system 102 can be any type of computer system, such as a computer system based on a microprocessor, a mainframe computer, a digital signal processor, a portable computing device, a personal organizer, a device controller, and a computational engine within an appliance.

Real-time telemetry system 100 also contains telemetry device 104, which gathers telemetry signals 106 from the various sensors and monitoring tools within computer system 102, and directs telemetry signals 106 to a local or a remote location that contains remaining useful life (RUL) prediction tool 108.

Note that telemetry signals 106 gathered by real-time telemetry system 104 can include signals associated with physical and/or software performance parameters measured through sensors within the computer system. The physical parameters can include, but are not limited to: distributed temperatures within the computer system, relative humidity, cumulative or differential vibrations within the computer system, fan speed, acoustic signals, currents, voltages, time-domain reflectometry (TDR) readings, and miscellaneous environmental variables. The software parameters can include, but are not limited to: load metrics, CPU utilization, idle time, memory utilization, disk activity, transaction latencies, system throughput, queue lengths, I/O traffic, bus saturation metrics, FIFO overflow statistics, and other performance metrics reported by the operating system.

Telemetry device 104 samples the values for various system parameters ("telemetry metrics") within computer system 102 and reports these values to RUL prediction tool 108, so that RUL prediction tool 108 can compute a RUL for computer system 102. This RUL can be used to make decisions about the subsequent operation of computer system 102. For example, a system administrator may decide to take a computer system off-line for needed repairs before, rather than after, a busy season (such as income tax season for an on-line income tax service) if the RUL indicates that the system is very likely to fail during the busy season.

Remaining Useful Life Prediction Tool

Figure 2:
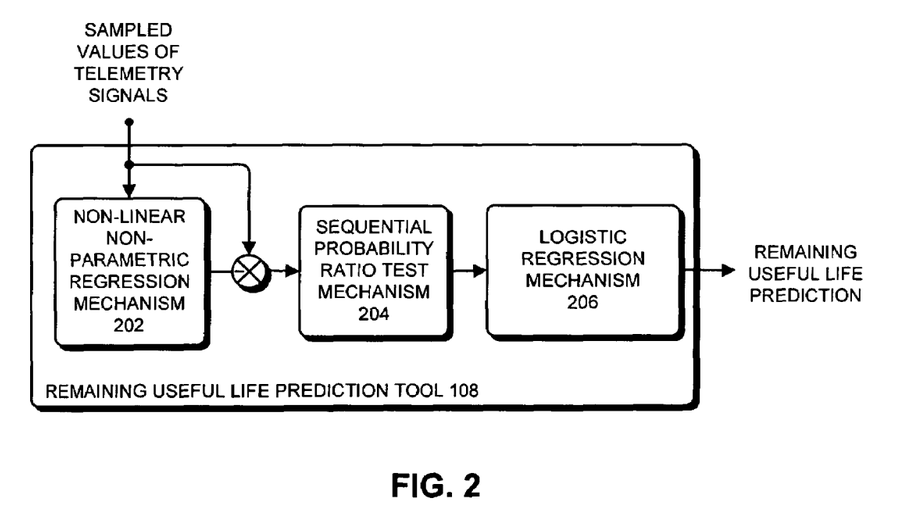
FIG. 2 illustrates a RUL prediction tool in accordance with an embodiment of the present invention.

FIG. 2 illustrates a RUL prediction tool 108 in accordance with an embodiment of the present invention. RUL prediction tool 108 includes non-linear, non-parametric (NLNP) regression mechanism 202, sequential probability ratio test (SPRT) mechanism 204, and logistic regression mechanism 206.

RUL prediction tool 108 receives sampled values of one or more telemetry metrics from telemetry device 104. We denote these telemetry metrics as $X=[X\_1, \ldots, X\_m]$, where $X(t)=[X\_1(t), \ldots, X\_m(t)]$ is the value of the telemetry metrics at time t.

Upon receiving the sampled values, NLNP regression mechanism 202 performs a non-linear, non-parametric regression analysis on the samples (including a "current sample"). When the analysis is completed, NLNP regression mechanism 202 outputs a predicted value for the current sample.

In one embodiment of the present invention, NLNP regression mechanism 202 uses a multivariate state estimation technique ("MSET") to perform the regression analysis. The term MSET as used in this specification refers to a technique that loosely represents a class of pattern recognition algorithms. For example, see [Gribok] "Use of Kernel Based Techniques for Sensor Validation in Nuclear Power Plants," by Andrei V. Gribok, J. Wesley Hines, and Robert E. Uhrig, *The Third American Nuclear Society International Topical Meeting on Nuclear Plant Instrumentation and Control and Human-Machine Interface Technologies*, Washington D.C., Nov. 13-17, 2000. This paper outlines several different pattern recognition approaches. Hence, the term "MSET" as used in this specification can refer to (among other things) any technique outlined in [Qribok], including Ordinary Least Squares (OLS), Support Vector Machines (SVM), Artificial Neural Networks (ANNs), MSET, or Regularized MSET (RMSET).

The predicted value for the current sample is subtracted from the actual value for the current sample and the result of that subtraction (i.e. the "residual") is passed to SPRT mechanism 204. For the embodiment of the present invention that uses MSET regression analysis, the residual can be calculated using the following expression:

$$R(t)=X(t)-MSET(X(t)).$$

The foregoing step takes away (or filters) the dynamics in the signals X(t) so that the residual R(t) is a stationary random process when the system is in good condition. As the system ages or degrades due to a failure mechanism, the statistical properties of the residual change. This change is detected by SPRT mechanism 204.

SPRT mechanism 204 applies a sequential probability ratio test to the residuals and produces an alarm when one or several residuals become statistically different from the residual corresponding to the undegraded condition of the system. As degradation progresses, the tripping frequency of the alarms produced by SPRT mechanism 204 increases. We denote these alarm-tripping frequencies as $F=[F\_1, \ldots F\_m]$, where $F(t)=[F\_1(t), \ldots F\_m(t)]$ is the value of the prognostic parameters at time t. Hence, at time t:

$$F(t)=SPRT(R(t)).$$

Logistic regression mechanism 206 records each instance of SPRT mechanism 204 tripping an alarm and uses these instances to determine the current alarm-tripping frequency of SPRT mechanism 204. Logistic regression mechanism 206 then calculates the RUL of the computer system in the following way. We denote the probability of system S to fail within next T hours given the current condition determined by the current SPRT alarm-tripping frequencies F as p(T,F). The relationship between the p and the current condition F is modeled using the linear logistic regression model:

$$p(T,X)=1/(1+\exp(-(a(T)+b\_1(T)*F\_1+b\_2(T)*F\_2+\ldots+b\_m(T)*F\_m))).$$

where $a(T)$ and $b(T)=[b\_1(T), \ldots, b\_m(T)]$ are estimated from historical or experimental failure data for the system. Note that the tripping frequencies are normalized to have values between 0 and 1 to simplify this calculation.

Embodiments of the present invention calculate a RUL for a time T given a SPRT alarm tripping frequency F. Alternative embodiments calculate a distribution of the RUL for a range of times T from 0 to infinity given a SPRT alarm tripping frequency F.

RUL Predictions

FIGS. 3A-3F present a series of graphs illustrating RUL values in accordance with embodiments of the present invention. For the graphs we use T=70 hours. Each circle in the graphs represents an individual system/component from either historical or experimental data. Note that in the following graphs, a "1-dimensional" failure model is a mechanism relating a single parameter $x\_1$ to the probability of failure of the system in next T hours.

Figure 3A:
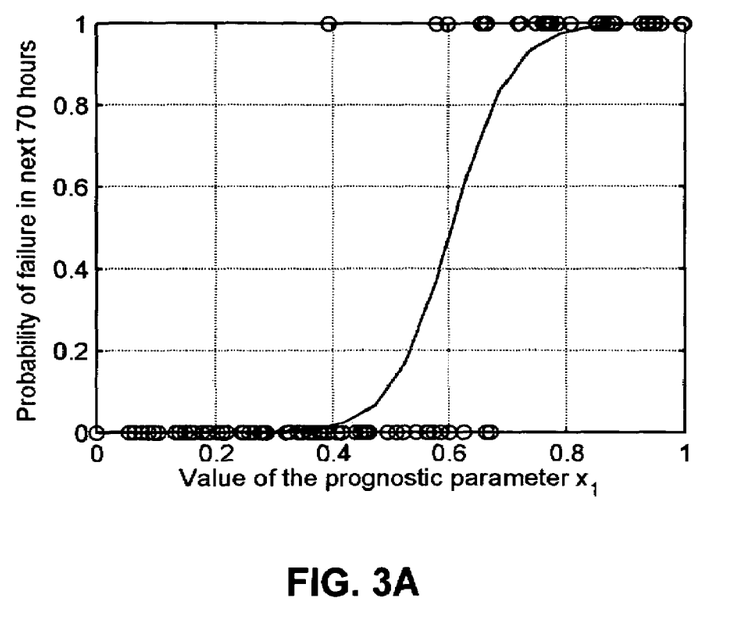
FIGS. 3A-3F present a series of graphs illustrating RUL values in accordance with embodiments of the present invention.

The graph in FIG. 3A presents a 1-dimensional failure model in accordance with an embodiment of the present invention. When the actual failure model is 1-dimensional, the 1-dimensional logistic regression model provides an adequate approximation to the probability of failure in next T hours given the current condition $x\_1$.

Figure 3B:
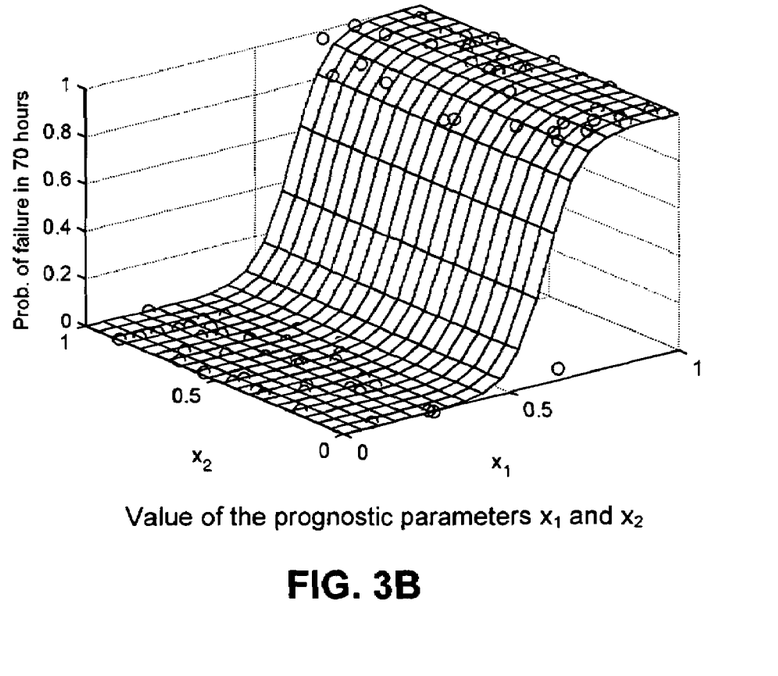

The graph in FIG. 3B presents a 2-dimensional failure model in accordance with an embodiment of the present invention. As shown in FIG. 3B, when the actual model is 1-dimensional, the addition of an extra parameter does not improve fit. However, the addition of an irrelevant prognostic parameter increases uncertainty in the RUL estimation.

Figure 3C:
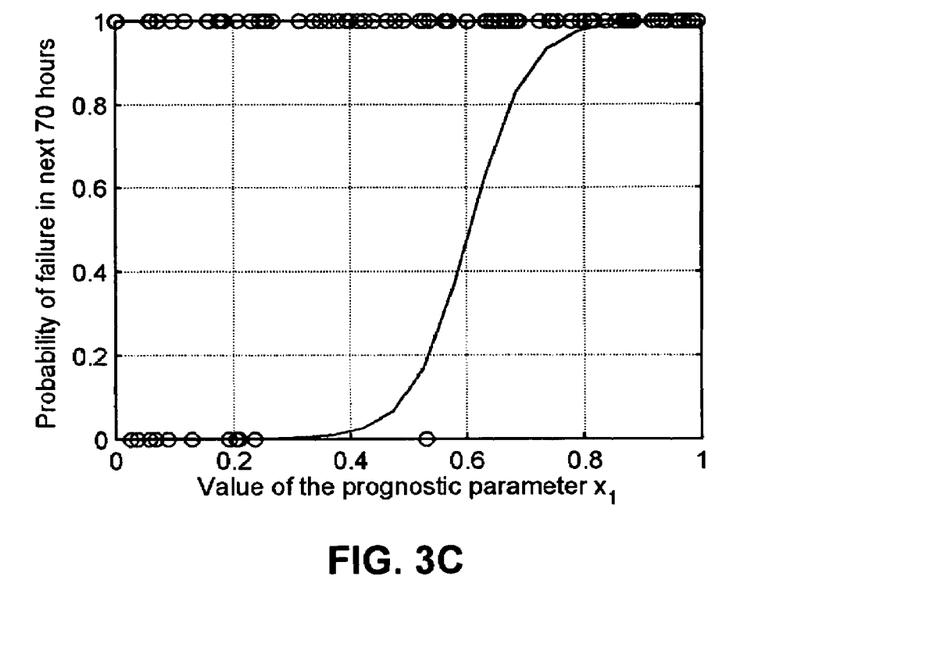

The graph in FIG. 3C presents a 1-dimensional failure model in accordance with an embodiment of the present invention. When the true failure model is 2-dimensional, the 1-dimensional model has a poor fit into failure data. Hence, in these cases, a higher order failure model is desirable in order to accurately compute an RUL estimation.

Figure 3D:
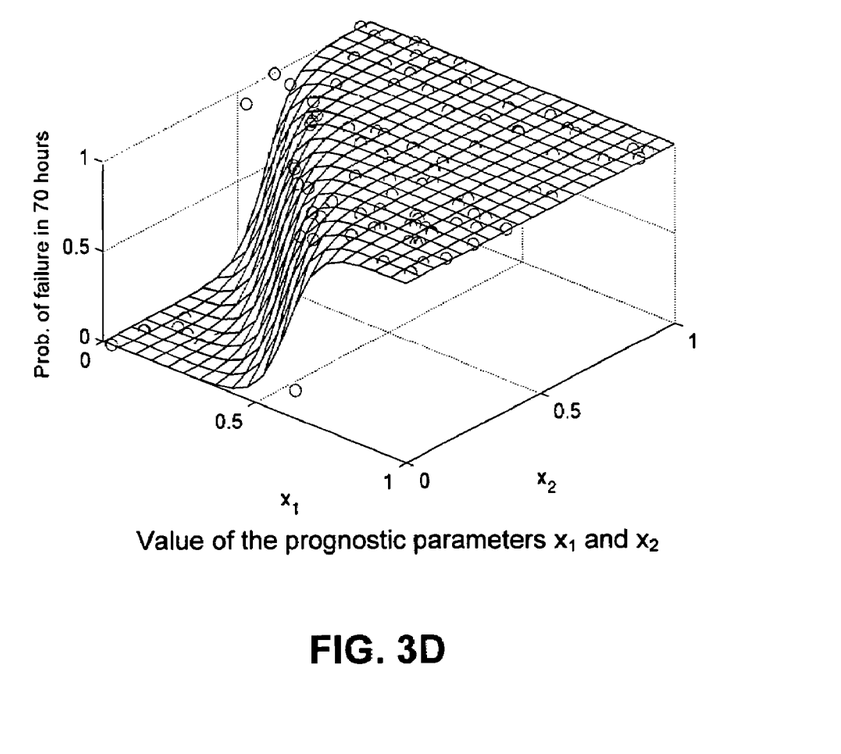

The graph in FIG. 3D presents a 2-dimensional failure model in accordance with an embodiment of the present invention. The 2-dimensional logistic regression adequately fits the failure data that came from a 2-dimensional failure model (and therefore the RUL estimation from such a model can be more accurate).

Figure 3E:
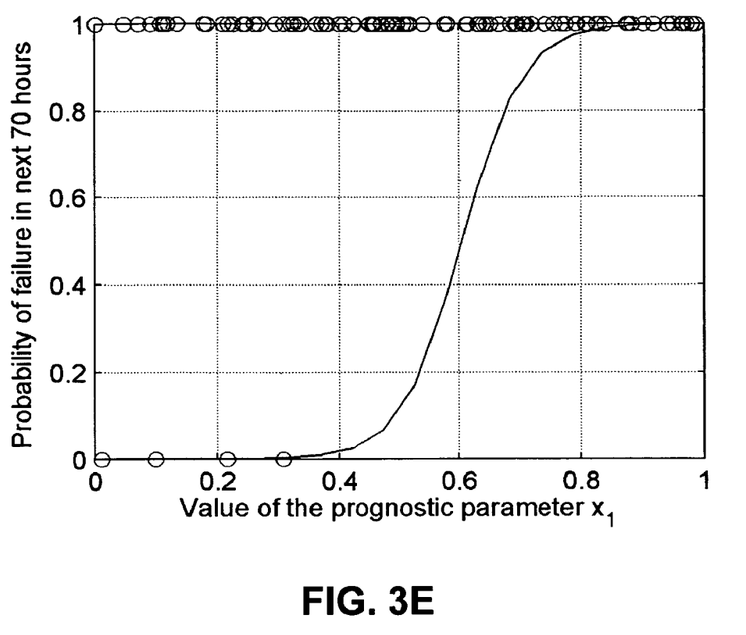

The graph in FIG. 3E presents a 1-dimensional failure model in accordance with an embodiment of the present invention. As was true with the earlier 1-dimensional graph (see FIG. 3C), when there are three or more parameters, the fit of the 1-dimensional failure model is not adequate.

Figure 3F:
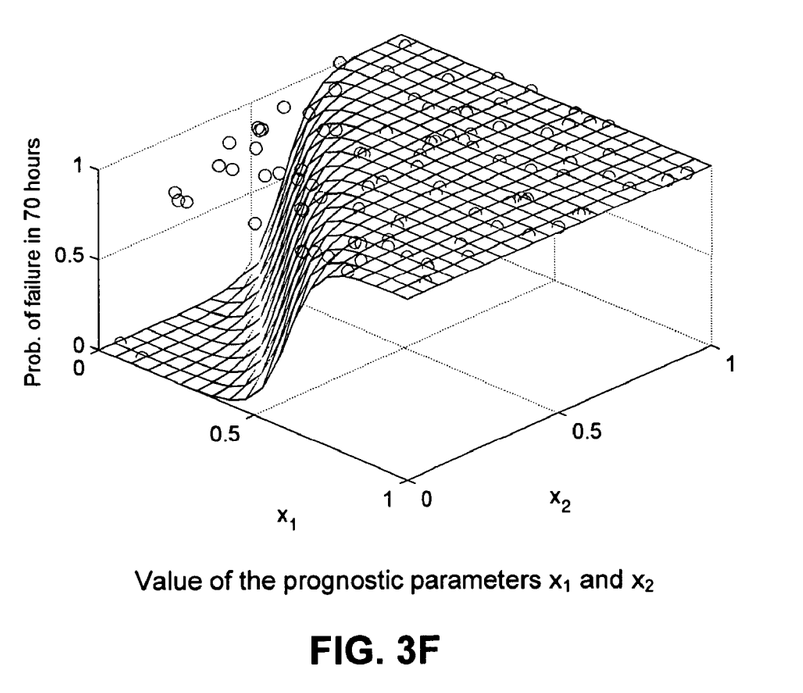

The graph in FIG. 3F presents a 2-dimensional failure model in accordance with an embodiment of the present invention. When there are three or more parameters, the fit of the 2-dimensional failure model is also not adequate and gives less accurate RUL predictions.

Distribution of RUL Predictions

Figure 4A:
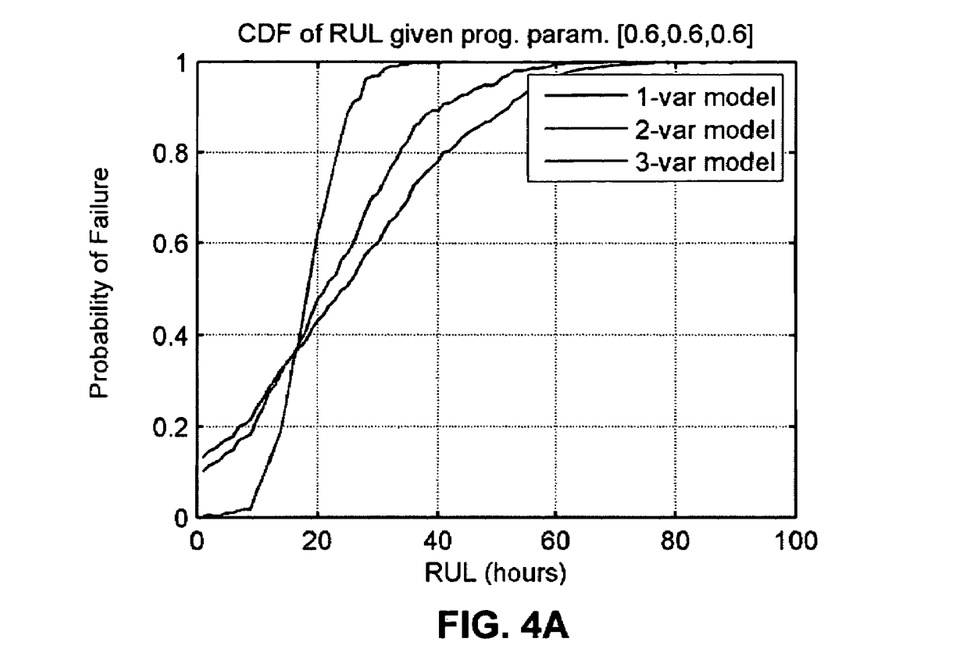
FIG. 4A presents a graph that illustrates an approximated cumulative distribution function (CDF) in accordance with an embodiment of the present invention.

FIG. 4A presents a graph that illustrates an approximated cumulative distribution function (CDF) in accordance with an embodiment of the present invention. The CDF of the RUL for the observed value of the prognostic parameter of [0.6 0.6 0.6] gives the probability of failure in next T hours. Note that the actual model relating SPRT tripping frequencies to the probability of failure in next T hours is 3-dimensional and hence we present the 1-dimensional model only for the purpose of illustration.

Figure 4B:
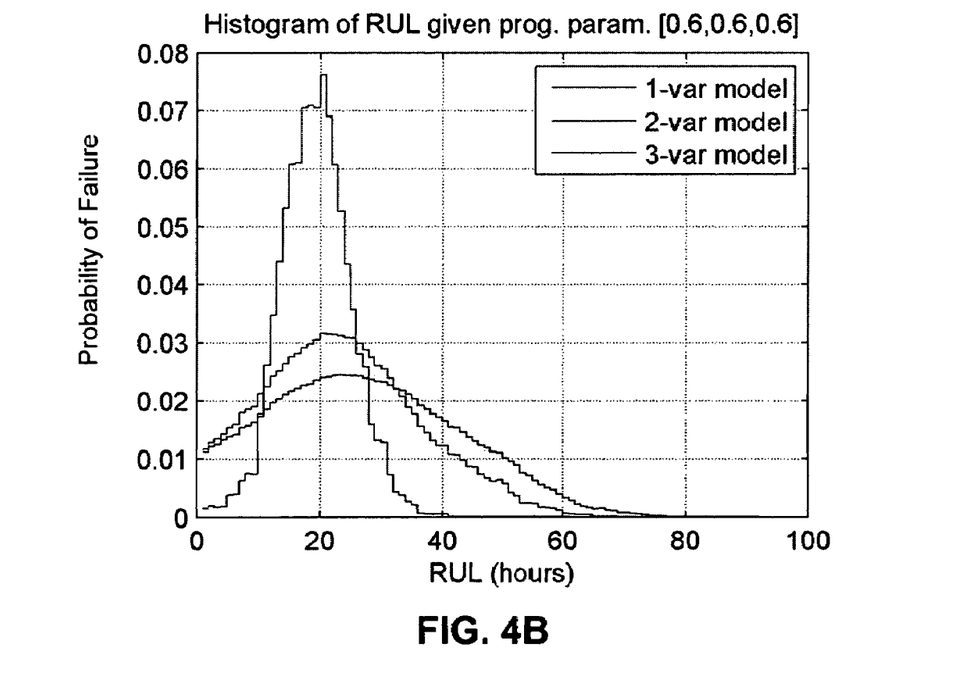
FIG. 4B presents a graph illustrating estimated probability density functions (PDF) of the RUL in accordance with an embodiment of the present invention.

FIG. 4B presents a graph illustrating estimated probability density functions (PDF) of the RUL in accordance with an embodiment of the present invention. When calculating the PDFs, we used the prognostic vector [0.6 0.6 0.6]. As can be seen in FIG. 4B, the 3-variable model gives the most accurate RUL prediction, whereas the 1-variable and 2-variable models produce predictions with larger uncertainties. Thus, according to the model, a system for which all 3 SPRT tripping frequencies have values 0.6 fails on average in 20 hours and with 0.99 probability in 40 hours. Whereas the models with lesser number of parameters provide prognosis in which more than ~30% of systems with current condition of 0.6 live beyond 40 hours.

Remaining Useful Life Calculation

Figure 5:
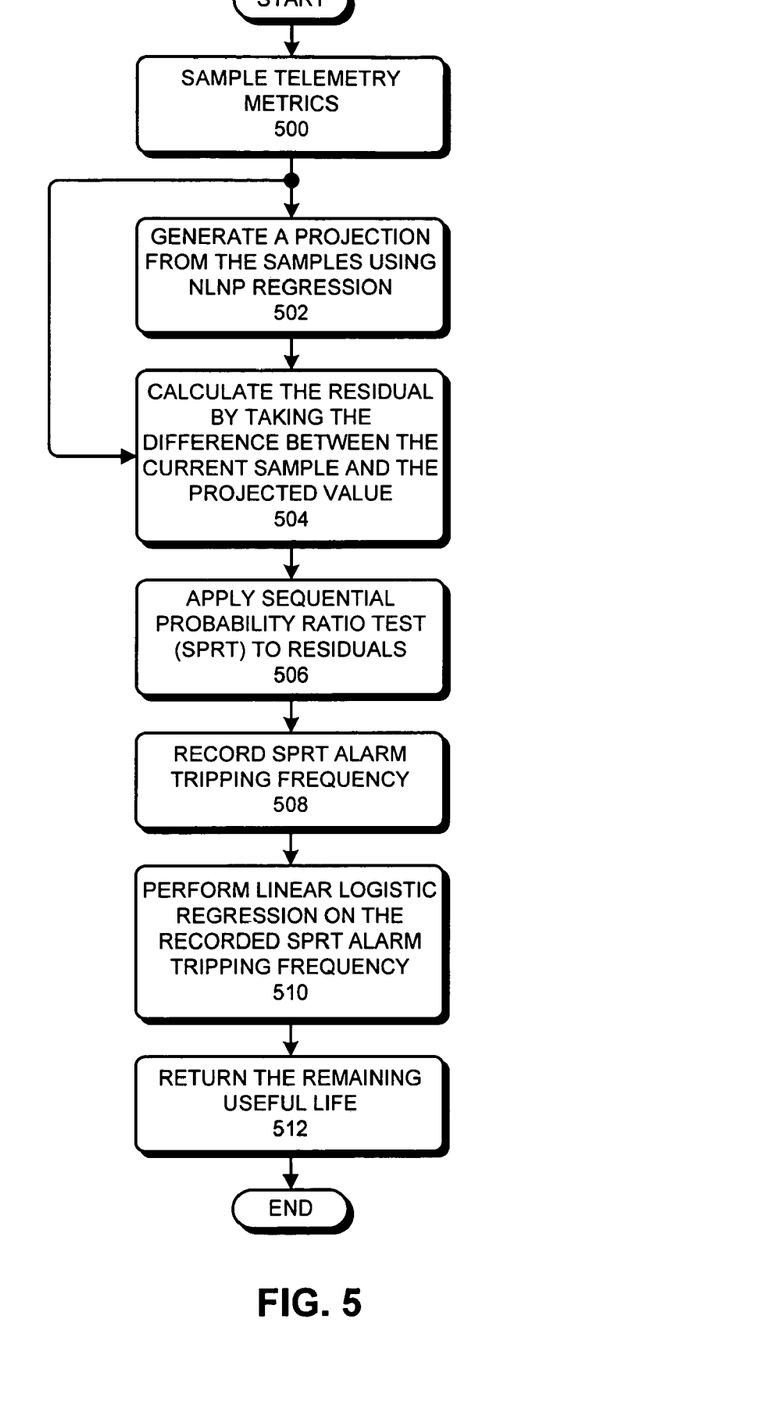
FIG. 5 presents a flowchart illustrating the process of calculating a prediction for the RUL of a computer system in accordance with an embodiment of the present invention.

FIG. 5 presents a flowchart illustrating the process of calculating a prediction for the RUL of a computer system 102 in accordance with an embodiment of the present invention. The process starts with telemetry device 104 collecting telemetry metrics from computer system 102 (step 500).

When a sufficient number of values have been collected, the system inputs the value into a mechanism that uses a non-linear, non-parametric regression analysis to calculate a projected value for the current sample (step 502). The system then computes a residual by subtracting the projected value from the current value (step 504).

The system next passes the residual to a mechanism that tracks the residuals using a SPRT (step 506). If the residual differs in a statistically significant way from the expected value for an undegraded computer system, the SPRT mechanism trips an alarm. The system monitors and records the frequency at which the SPRT mechanism is tripping alarms (step 508).

The system then performs a linear logistic regression analysis using the SPRT alarm-tripping frequency (step 510). From this analysis, the system returns a prediction for the remaining useful life (step 512).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for predicting a remaining useful life (RUL) for a computer system, comprising:
    collecting values of at least one telemetry metric from the computer system while the computer system is operating;
    using a non-linear, non-parametric regression model to predict a value for a current value, wherein the current value is one of the collected values;
    calculating a residual value by subtracting the predicted value from the current value;
    checking the residual value using a sequential probability ratio test (SPRT), wherein the SPRT generates an alarm based upon the residual value and a prior sequence of residual values;
    determining a rate at which the SPRT is generating alarms;
    inputting the rate at which the SPRT is generating alarms into a linear logistic regression model for generating a RUL obtained from prior failure data; and
    returning a RUL prediction calculated using the linear logistic regression model.

2. The method of claim 1, wherein collecting the values of the at least one telemetry metric involves repeatedly measuring at least one computer system parameter at a predetermined time interval, wherein the computer system parameter includes at least one of: usage rating, an idle time measure, a throughput, a latency within the computer system, a load in the computer system, a result returned from a software-based monitor, or another software parameter that indicates a current operating state of the computer system.

3. The method of claim 1, wherein collecting the values of the at least one telemetry metric involves repeatedly measuring at least one computer system parameter at a predetermined time interval, wherein the computer system parameter includes at least one of: a temperature, a voltage, a current, or another physical parameter that indicates a current operating state of the computer system.

4. The method of claim 1 wherein using the non-linear, non-parametric regression model involves using a multivariate state estimation technique (MSET).

5. An apparatus for predicting a remaining useful life (RUL) for a computer system, comprising:
    a collection mechanism coupled to the computer system, wherein the collection mechanism is configured to collect values of at least one telemetry metric from the computer system while the computer system is operating;
    a non-linear, non-parametric (NLNP) regression mechanism coupled to the collection mechanism, wherein the NLNP regression mechanism is configured to use a non-linear, non-parametric regression model to predict a value for a current value, wherein the current value is one of the collected values;

a residual value mechanism coupled to the NLNP regression mechanism, wherein the residual value mechanism is configured to calculate a residual value by subtracting the predicted value from the current value;

a RUL prediction mechanism configured to:
check the residual value using a sequential probability ratio test (SPRT), wherein the SPRT generates an alarm based upon the residual value and the prior sequence of residual values;
determine a rate at which the SPRT is generating alarms
input the rate at which the SPRT is generating alarms into a linear logistic regression model for generating a RUL obtained from prior failure data; and
return a RUL prediction calculated using the linear logistic regression model.

6. The apparatus of claim 5, wherein the collection mechanism is configured to collect the values of the at least one telemetry metric by repeatedly measuring at least one computer system parameter at a predetermined time interval, wherein the computer system parameter includes at least one of: a usage rating, an idle time measure, a throughput, a latency within the computer system, a load in the computer system, a result returned from a software-based monitor, or another software parameter that indicates a current operating state of the computer system.

7. The apparatus of claim 5, wherein the collection mechanism is configured to collect the values of the at least one telemetry metric by repeatedly measuring at least one computer system parameter at a predetermined time interval, wherein the computer system parameter includes at least one of: a temperature, a voltage, a current, or another physical parameter that indicates a current operating state of the computer system.

8. The apparatus of claim 5 wherein the RUL prediction mechanism is configured to use a multivariate state estimation technique (MSET) as the non-linear, non-parametric regression model.

9. A monitoring system for predicting a remaining useful life (RUL) for a computer system, comprising:
a collection mechanism coupled to the computer system, wherein the collection mechanism is configured to collect values of at least one telemetry metric from the computer system while the computer system is operating;

a non-linear, non-parametric (NLNP) regression mechanism coupled to the collection mechanism, wherein the NLNP regression mechanism is configured to use a non-linear, non-parametric regression model to predict a value for a current value, wherein the current value is one of the collected values;

a residual value mechanism coupled to the NLNP regression mechanism, wherein the residual value mechanism is configured to calculate a residual value by subtracting the predicted value from the current value;

a RUL prediction mechanism configured to:
check the residual value using a sequential probability ratio test (SPRT), wherein the SPRT generates an alarm based upon the residual value and the prior sequence of residual values;
determine a rate at which the SPRT is generating alarms
input the rate at which the SPRT is generating alarms into a linear logistic regression model for generating a RUL obtained from prior failure data;
return a RUL prediction calculated using the linear logistic regression model; and
an interface device coupled to the RUL prediction mechanism, wherein the interface device is configured to deliver the RUL prediction to a human user or to another system.

10. The monitoring system of claim 9, wherein the collection mechanism is configured to collect the values of the at least one telemetry metric by repeatedly measuring at least one computer system parameter at a predetermined time interval, wherein the computer system parameter includes at least one of: a usage rating, an idle time measure, a throughput, a latency within the computer system, a load in the computer system, a result returned from a software-based monitor, or another software parameter that indicates a current operating state of the computer system.

11. The monitoring system of claim 9, wherein the collection mechanism is configured to collect the values of the at least one telemetry metric by repeatedly measuring at least one computer system parameter at a predetermined time interval, wherein the computer system parameter includes at least one of: a temperature, a voltage, a current, or another physical parameter that indicates a current operating state of the computer system.

12. The monitoring system of claim 9, wherein the RUL prediction mechanism is configured to use a multivariate state estimation technique (MSET) as the non-linear, non-parametric regression model.

\* \* \* \* \*

UNITED STATES PATENT AND TRADEMARK OFFICE
CERTIFICATE OF CORRECTION

| | | |
|---|---|---|
| PATENT NO. | : 7,702,485 B2 | Page 1 of 1 |
| APPLICATION NO. | : 11/635450 | |
| DATED | : April 20, 2010 | |
| INVENTOR(S) | : Kenny C. Gross et al. | |

It is certified that error appears in the above-identified patent and that said Letters Patent is hereby corrected as shown below:

In column 4, line 2, delete "[Qribok]" and insert -- [Gribok] --, therefor.

Signed and Sealed this
Twelfth Day of April, 2011

David J. Kappos
*Director of the United States Patent and Trademark Office*